March 6, 1928.

J. E. ERICKSON ET AL 1,661,415

APPARATUS FOR SUPPLYING LIQUID FUEL TO HEATING PLANTS

Filed Aug. 17, 1925    6 Sheets-Sheet 1

Inventors:
J. E. Erickson.
W. F. Erickson.
By Whitley and Ruckman
Attorneys.

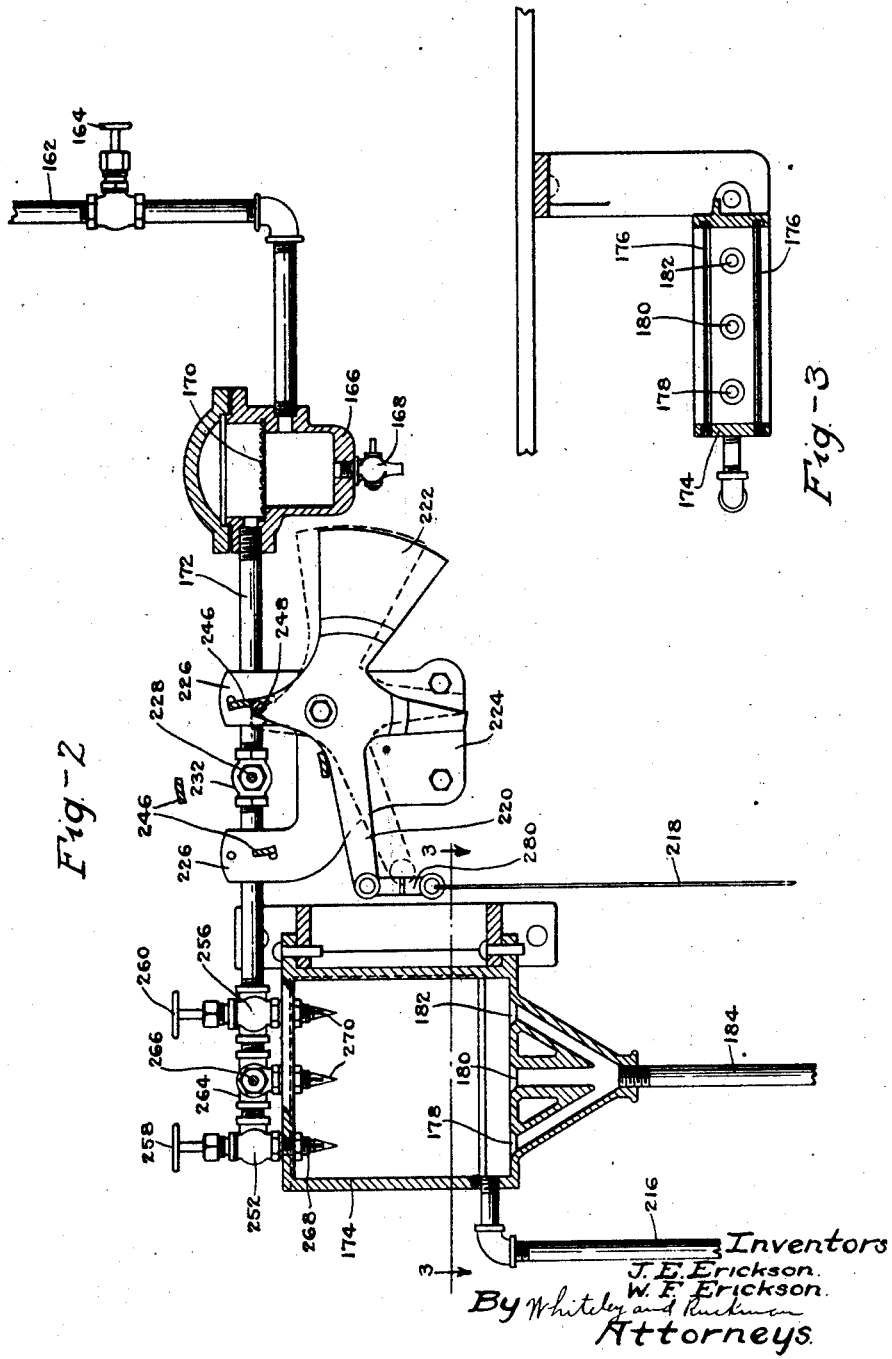

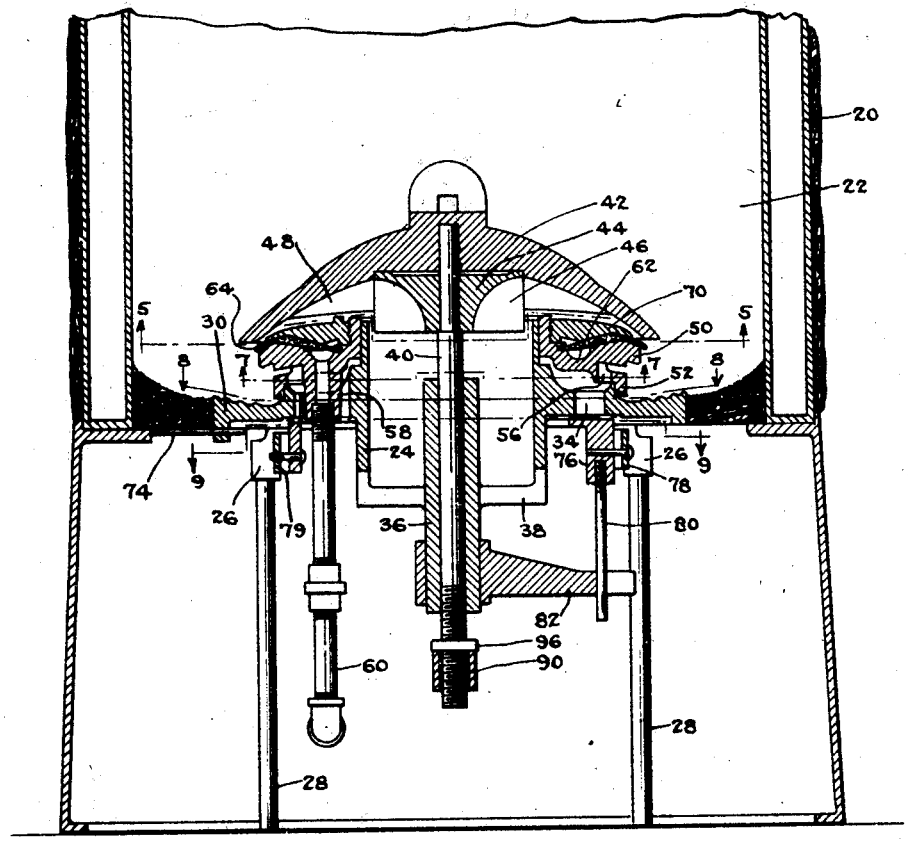
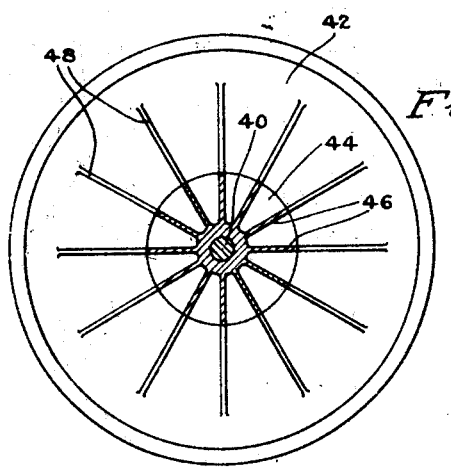
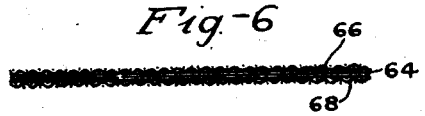

March 6, 1928. 1,661,415
J. E. ERICKSON ET AL
APPARATUS FOR SUPPLYING LIQUID FUEL TO HEATING PLANTS
Filed Aug. 17, 1925 6 Sheets-Sheet 4

Inventors.
J. E. Erickson.
W. F. Erickson.
By Whiteley and Ruckman
Attorneys.

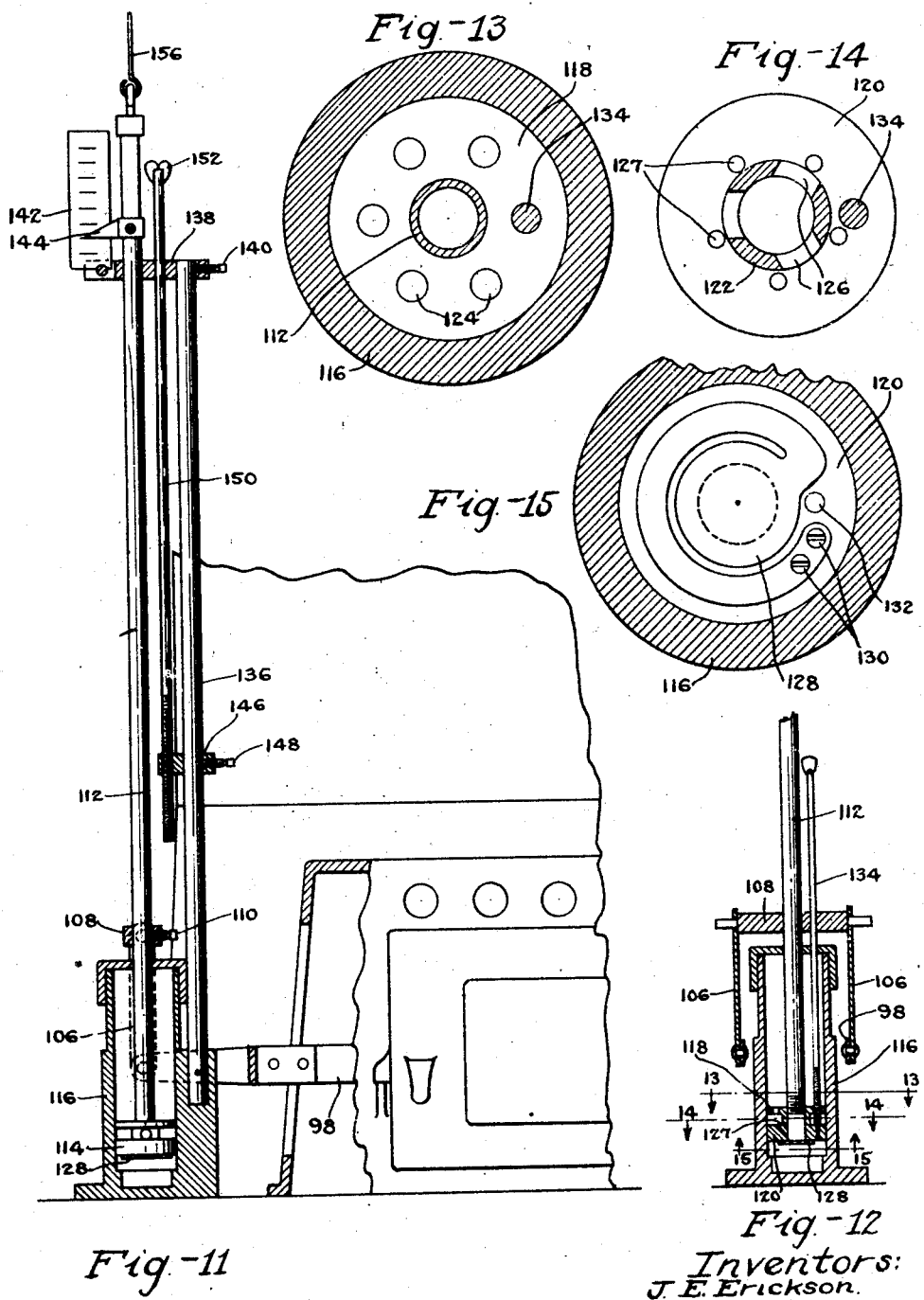

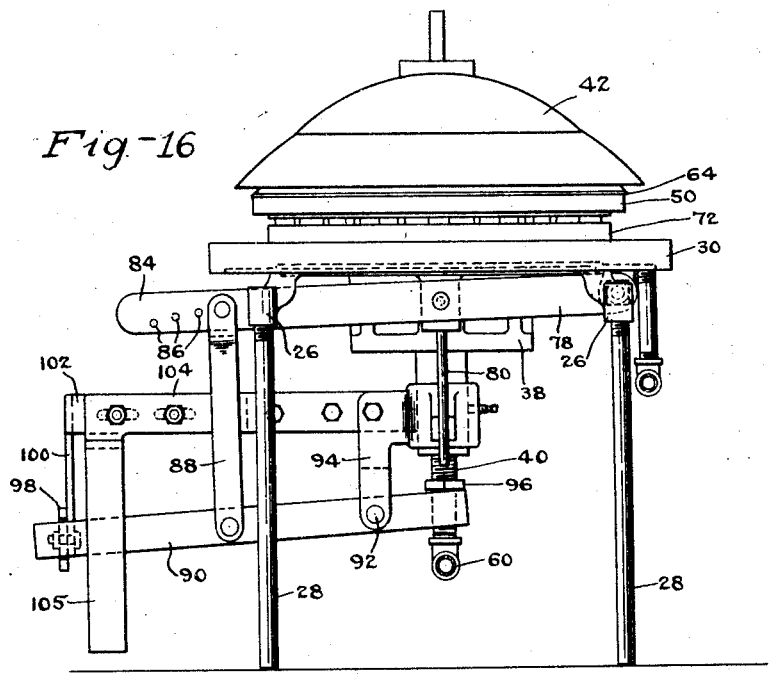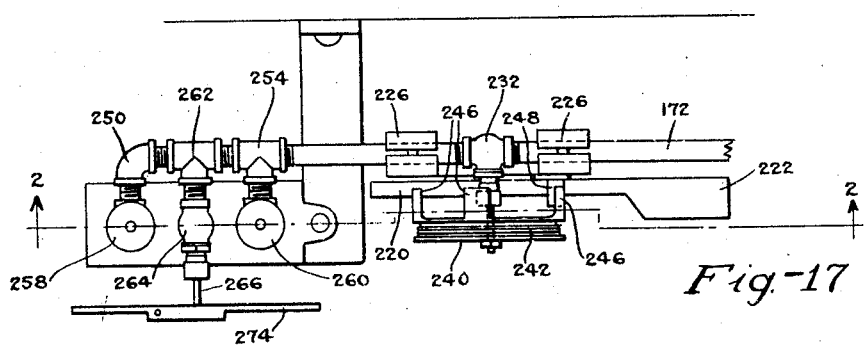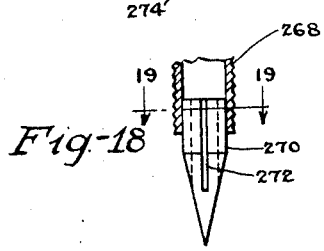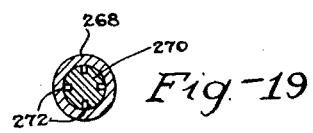

Patented Mar. 6, 1928.

1,661,415

UNITED STATES PATENT OFFICE.

JOHN E. ERICKSON AND WALTER F. ERICKSON, OF ST. PAUL, MINNESOTA.

APPARATUS FOR SUPPLYING LIQUID FUEL TO HEATING PLANTS.

Application filed August 17, 1925. Serial No. 50,866.

Our invention relates to apparatus for supplying liquid fuel to heating plants. Among the objects of the invention are to provide for thoroly mixing air supplied directly from atmosphere with the liquid fuel as it is being burned, to provide means for simultaneously varying the amount of air and liquid fuel according to the amount of heat which it is desirable to produce at any given time, and to provide means whereby the liquid fuel is caused to pass in drops from the source of supply to the burner.

The full objects and advantages of our invention will appear in connection with the detailed description thereof and the novel features embodied in our inventive idea will be particularly pointed out in the claims.

Figure 1:
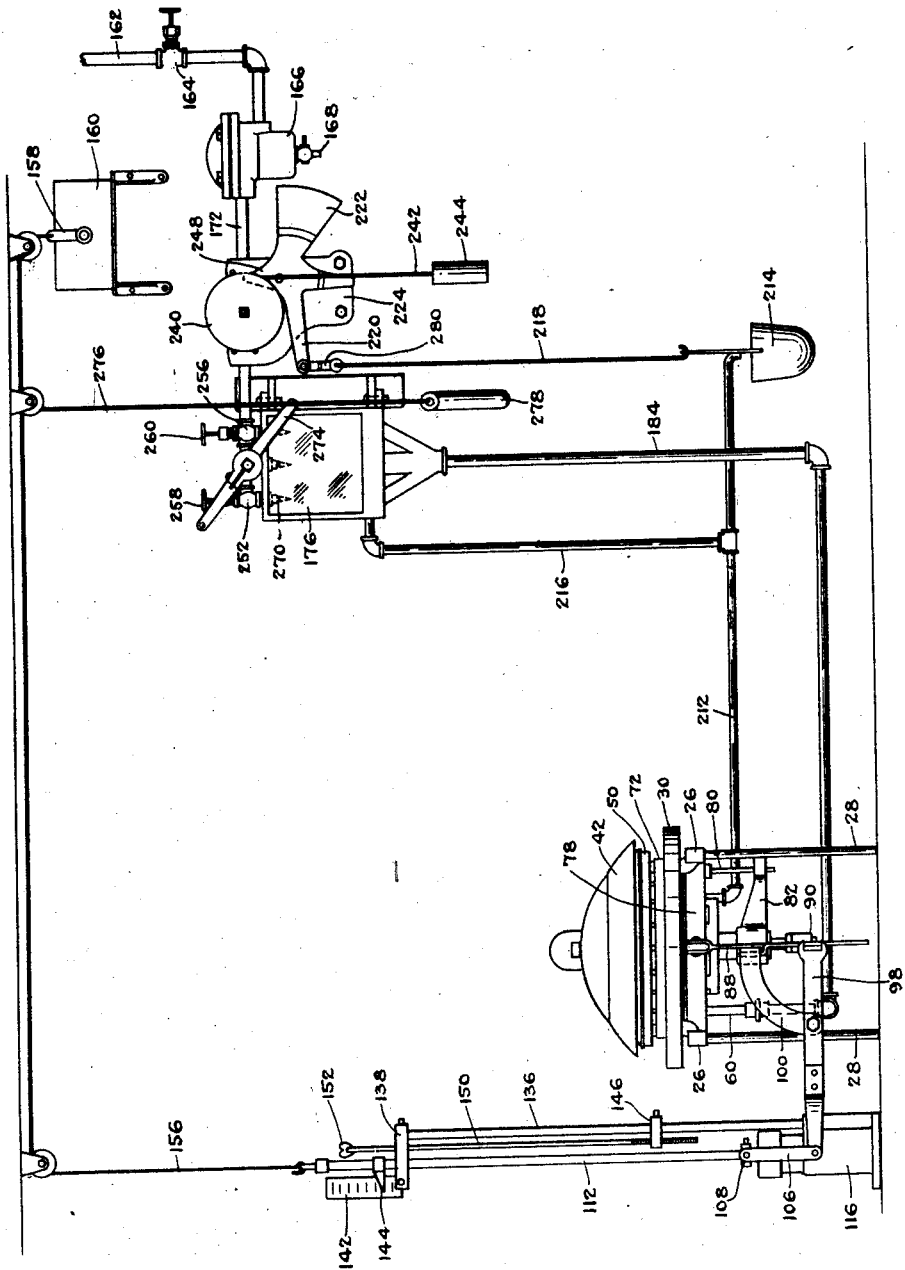
Figure 7:
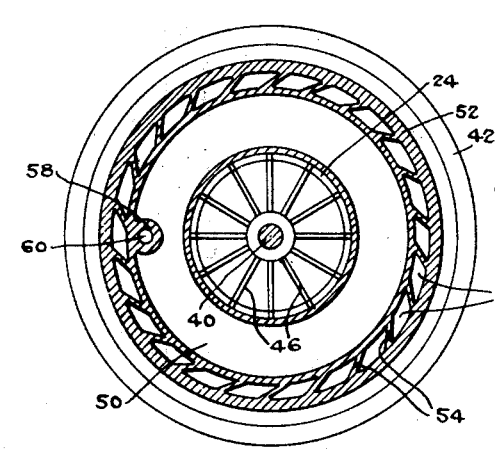
Figure 9:
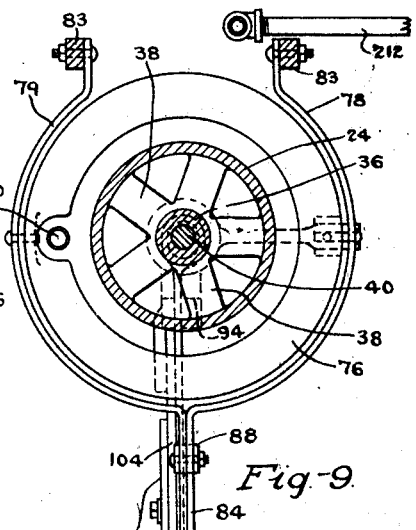
Figure 8:
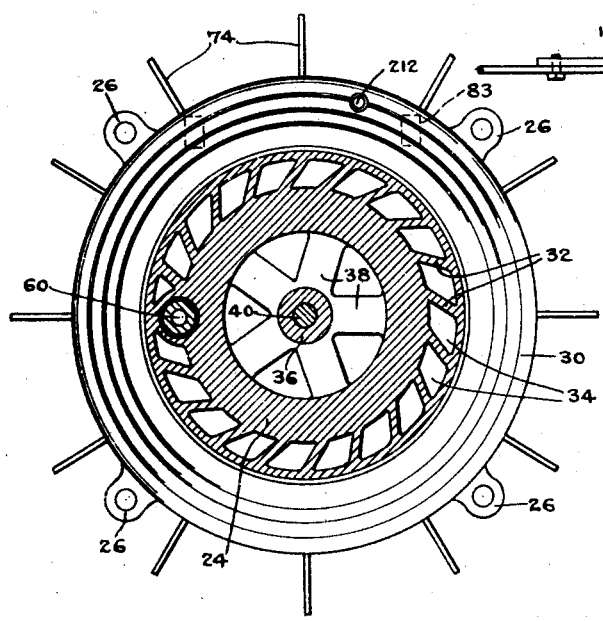
Figure 10:
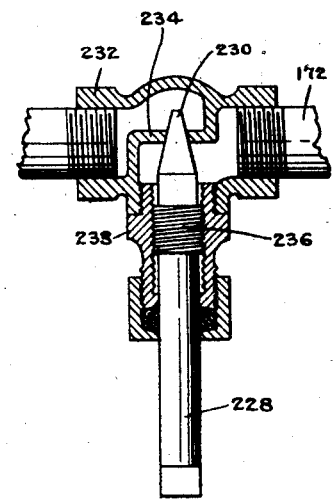

In the accompanying drawings which illustrate one form in which our invention may be embodied, Fig. 1 is an elevational view of the apparatus. Fig. 2 is a view in vertical section on the line 2—2 of Fig. 17. Fig. 3 is a view in horizontal section on the line 3—3 of Fig. 2. Fig. 4 is a view of the burner in vertical section showing it in place in a furnace. Fig. 5 is a view in horizontal section on the line 5—5 of Fig. 4. Fig. 6 is a detailed view of a wick for the burner. Fig. 7 is a view in horizontal section on the line 7—7 of Fig. 4. Fig. 8 is a view in horizontal section on the line 8—8 of Fig. 4. Fig. 9 is a view in horizontal section on the line 9—9 of Fig. 4. Fig. 10 is a sectional view of a valve device. Fig. 11 is a sectional, elevational view of an air controlling device. Fig. 12 is a fragmentary sectional view taken at right angles to Fig. 11. Fig. 13 is an enlarged view in horizontal section on the line 13—13 of Fig. 12. Fig. 14 is an enlarged view in horizontal section on the line 14—14 of Fig. 12. Fig. 15 is an enlarged view in horizontal section on the line 15—15 of Fig. 12. Fig. 16 is an elevational view of the burner. Fig. 17 is a top plan view of a liquid fuel controlling device. Fig. 18 is a sectional fragmentary view of a portion of the liquid fuel controlling device. Fig. 19 is a view in horizontal section on the line 19—19 of Fig. 18.

As will be understood from Fig. 4 the apparatus is intended for use in connection with a furnace or other heating plant having a casing 20 enclosing a fire box 22 in which a burner is placed. The burner includes a central member 24 having lugs 26 which are internally threaded to receive the threaded upper ends of rods 28, constituting legs by which the burner is supported. An annular flange 30 is attached to the member 24 by connecting elements 32 spaced from each other to provide air passages 34. The member 24 as shown in Fig. 4 is hollow and supports a tubular guide 36 connected thereto by arms 38. The guide 36 slidably receives a rod 40 to the upper end of which is secured a rather heavy dome shaped member 42 underneath which, and held in engagement therewith, is a smaller member 44 having radial wings 46 on its lower side which align with radial wings 48 on the lower side of the dome member 42. The wings cause the air to be equally distributed around the margin of the burner. Secured to the upper end of the central member 24 is a ring 50 having a depending annular flange 52 connected thereto by elements 54 whereby air passages 56 are formed which constitute a continuation of the air passages 34. The ring 50 is formed with a hollow boss 58 into which the upper end of a liquid fuel supply pipe 60 is threaded. The boss 58 connects with an annular trough 62 formed in the upper surface of the ring 50 which receives liquid fuel from the supply pipe. Above this trough and resting upon the ring 50 is an annular wick which consists of asbestos 64 placed between pieces of wire mesh 66 and 68 as shown in Fig. 6. Resting on top of the wick and screwed upon the upper portion of the ring 50 is a ring 70. As shown in Fig. 4 the space between the periphery of the flange 30 and the wall of the furnace is filled with a layer of asbestos 72 which rests upon the rods 74 so that the draft of the furnace is entirely thru the burner. A portion of the air carried in by the draft passes up thru the hollow member 24 and out thru the space between the margins of the dome member 42 and the ring 70 so that this air is delivered just above the wick 64. The remainder of the air goes up thru the passages 34 and 56 so as to be delivered just below the wick. The flow of air thru the passages 34 and 56 is controlled by a ring 76 placed below the passages 34 so that when the ring is raised to its full extent, the flow of air thru these passages is entirely shut off. In order to raise and lower the ring 76, curved arms 78 and 79 are pivotally attached thereto. The ring 76 is guided for up and down movement by means of a rod 80 which passes thru a notch in an arm 82 secured to the tubular member 36. The free ends of the arms 78 and 79 are pivotally attached as shown in Fig. 9 to lugs 83. At the opposite side the arms are brot together and extended outwardly to form an arm member 84 which is provided with a series of holes 86, any one of which is adapted to receive the pivot of a link 88 which connects with a lever 90 intermediately pivoted at 92 to a downward projection 94. The inner end of the lever 90 is forked to straddle the lower end of the rod 40 which is screw threaded to receive a nut 96 with which the fork engages. When the outer end of this lever is depressed the rod 40 will be lifted and thereby lift the dome member 42 to increase the size of the air passage between the latter and the ring 70. At the same time the link 88 will be lowered which will depress the arm member 84 and thereby lower the ring 76, so as to increase the opening leading to the air passages 34 and 56. When the lever 90 is moved in the other direction the reverse operation will occur and the amount of air delivered both above and below the wick will be decreased. The extent of movement of the ring 76 may be varied by placing the pivot of the link 88 in another one of the holes 86 while the extent of movement of the dome member 42 may be varied by turning the nut 96. These adjustments are made independently so that the amount of air delivered both above and below the wick may be varied for any given position of the lever 90. The movement of this lever is produced by another lever 98 which is intermediately pivoted to the lower end of a downwardly curved projection 100 extending from a bar 102 adjustably secured to a bar 104 which at its outer end is turned downwardly to form a guide 105 for the lever 90. One end of the lever 98 is forked so as to straddle the outer end of the lever 90 and the other end of the lever 98 is also forked, the branches of this latter fork being connected by links 106 with a ring 108 adjustably secured by a set screw 110 to a plunger rod 112 having a plunger 114 at its lower end which works in a cylinder 116, containing oil. The plunger 114 as best shown in Fig. 12 has an upper cylinder engaging member 118 and a lower cylinder engaging member 120 connected by a hollow neck 122. The member 118 has a plurality of vertical perforations 124 and the neck member 122 has a plurality of horizontal passageways 126 and inclined passageways 127. The vertical opening in the hollow neck member continues thru the lower member 120 and this opening is normally closed by a valve 128 of spring metal secured to the lower surface of the member 120 by screws 130 as shown in Fig. 15. The lower member 120 contains a perforation 132 controlled by a needle valve on the lower end of a stem 134 whose lower end is screw threaded and engages in a screw threaded hole in the member 118 whereby the needle valve may be adjusted. It is evident that the plunger 114 may move quickly in upward direction since the pressure of oil will open the valve 128 and permit the oil to flow quickly past the plunger into the lower portion of the cylinder. The amount of air introduced above and below the wick 64 will therefore be quickly increased. However, when the plunger moves downward the flow of oil is all thru the perforation 132 controlled by the needle valve so that the plunger is compelled to descend slowly. The weight of the dome member 42 is sufficient to cause the plunger 114 to move downward when the plunger is free to thus move, but since the movement is necessarily slow the amount of air introduced above and below the wick will be cut down slowly. A rod 136 extends upwardly from the cylinder 116. A disk 138 is adjustably secured to the upper end of this rod by a set screw 140 passing thru the periphery of the disk. At the opposite side of the disk there is secured a scale 142 with which cooperates a pointer 144 secured to the plunger 112 whereby the amount of air being supplied to the burner is indicated. A disk 146 is secured to the rod 136 by a set screw 148. The disk 146 contains a screw threaded hole which is engaged by the lower threaded portion of a rod 150 which passes loosely thru the disk 138. The upper end of the rod 150 carries a head 152 by means of which the rod may be turned so that its lower end constitutes an adjustable stop for engagement by the set screw 110 so that the extent to which the plunger can move upwardly may be varied according to the amount of air it is desired to supply to the burner when operating at full capacity. The plunger rod 112 is connected by a cable or chain 156 with an arm 158 of a thermostat 160 which may be placed in any suitable location. As the thermostat heats up, the cable 156 is slackened so that the amount of air supplied to the burner is gradually cut down. It will be understood that the amount of liquid fuel supplied to the burner is at the same time cut down so that the amount of heat delivered will be decreased.

Liquid fuel for the burner is supplied from any convenient source of supply thru a pipe 162 containing a shut off valve 164. The pipe 162 leads into the lower portion of a receptacle 166 at the lower end of which is a draw off cock 168 by means of which sediment may be removed. Above the place of entrance of the pipe 162 the receptacle 166 is provided with a horizontal screen 170 above which a pipe 172 leads from the receptacle 166 to a receptacle 174 having glass sides 176, thru which the amount of liquid fuel which drips into the receptacle may be observed. The manner in which the drip of the liquid fuel is controlled will presently be described. The bottom of the receptacle 174 is provided with openings 178, 180 and 182 which lead into a pipe 184 connecting with the pipe 60 which supplies the liquid fuel directly to the burner. An overflow pipe 202 leads from the upper side of the burner flange 30 which is troughed as shown in Fig. 4 and this pipe delivers into a bucket 214. In case liquid fuel passes thru the burner without being consumed it is conveyed to the bucket 214. An overflow pipe 216 leads from a position slightly above the bottom of the receptacle 174 into the pipe 212 so that if too much liquid fuel accumulates in the receptacle 174 it is conveyed into the bucket. The bucket is hung on a cable or chain 218, the upper end of which is secured to one end of a pivoted arm 220 the other end of which is weighted by a weight 222 heavier than the bucket and the part to which the bucket is attached, but lighter than the same when the bucket is nearly filled. The arm 220 is pivotally mounted on a support 224 clamped to the pipe 172 by clamps 226, as shown in Fig. 17. The stem 228 of a needle valve 230 shown in Fig. 10 extends out above the arm 220. The pipe 172 is provided with a union 232 which contains a longitudinal partition 234 having an opening engageable by the needle valve 230. The valve stem has a screw threaded portion 236 which engages screw threads formed in a gland 238. Secured to the outer end of the valve stem is a pulley 240 upon which is wound a portion of a cable 242 having a weight 244 attached to its lower end. The pulley 240 carries a number of equally spaced lugs 246 adapted to engage a detent 248 on the arm 220 when the latter occupies a position such as shown in full lines in Fig. 2. When the bucket 214 is nearly filled, the arm 220 is pulled into dotted line position shown in Fig. 2 and the pulley is released so that it is turned by means of the weight 244. This causes the needle valve 230 to be screwed down and close the passage thru the pipe 172 thereby shutting off the supply of liquid fuel. The valve is opened by turning the pulley in reverse direction which winds up the cable 242. Any one of the several lugs 246 may be engaged with the detent 248 according to the amount of opening desired for the valve. The manner in which the drip of the liquid fuel into the receptacle 174 is controlled will now be described. The pipe 172 terminates above this receptacle and is provided with an elbow 250 leading into a valve chamber 252 containing a valve similar to the valve 230 already described. The pipe 172 is also provided with a T 254 leading into a valve chamber 256 also containing a similar valve. The valve stems of these two valves are provided with hand wheels 258 and 260 respectively whereby the extent of opening of the valves may be manually controlled. The pipe 172 is also provided with a T 262 leading into a valve chamber 264 containing a valve similar to the valve 230 and having a valve stem 266. Tubes 268 such as shown in Figs. 18 and 19 lead from the lower ends of the valve chambers 252, 256 and 264 thru the top of the receptacle 174. The lower ends of the tubes 268 are provided with plugs 270 whose lower portions are pointed and whose sides are provided with grooves 272 for the passage of a small quantity of liquid fuel which runs down to the pointed end of the plug and drips therefrom. The position of the valve in the valve chamber 264 instead of being manually controlled as is the case with the other two valves just referred to is automatically controlled. For this purpose an arm 274 is secured to the valve stem 266. A cable 276 is secured intermediate its length to one end of the arm 274. A weight 278 is secured to the end of the cable below the arm 274 while the portion of the cable above the arm 274 extends to an arm of the thermostat 160. As the thermostat heats up, the valve stem 266 is turned in a direction to close the valve attached thereto so as to cut down the supply of liquid fuel. When this occurs, the plunger 114, on account of its dash-pot arrangement, previously described, descends slowly and gradually reduces at a slower rate the amount of air supplied to the burner thereby insuring at all times a sufficient amount of air to cause complete combustion of the liquid fuel.

The operation and advantages of our invention will be readily understood in connection with the foregoing description. When the burner is in use the hand wheels 258 and 260 are placed in the proper position to cause the liquid fuel to drop at the desired rate thru the receptacle 174 which constitutes a sight-feed device. If the liquid fuel accumulates too much in this receptacle it passes thru the overflow pipe 216 and enters the bucket 214 whereby the flow of liquid fuel is stopped by the closing of the valve 230 in the manner previously described. The opening and closing of the valve in the valve chamber 264 is automatically controlled according to the amount of heat it is desirable to deliver, the valve being nearly closed when the heat is cut down and the amount of air delivered to the burner being cut down at a slower rate on account of the construction already described. However, when the valve is opened the amount of air is, at the same time, quickly increased in the manner previously described. The draft of the furnace causes the air to pass thru the burner so that it is preheated before it reaches the flame and the air is delivered to both the top and bottom of the ring like flame thereby insuring complete combustion of the liquid fuel. The burner is so constructed that it may be readily installed in furnaces and other heating plants now in use. The valves in the two valve chambers 252 and 256 are set by hand to cause the liquid fuel to drip and in case one of them becomes clogged, there will still be a sufficient supply of liquid fuel to prevent the burner from going out entirely. It will be understood that when the burner is delivering a large amount of heat, the automatically operated valve in the valve chamber 264 is open so that the liquid fuel passes in a stream and when it is nearly closed the liquid fuel can get past the same only in drops. By referring to Fig. 4, it is evident that the margin of the movable dome member 42 operates at the place of combustion for controlling the supply of air. The ring-like member 70 rests upon the upper surface of the wick and causes all of the fuel to pass to the outer edge of the wick so that the flame cannot drop back into the burner. The cable or chain 218 is connected to the arm 220 by a fuse 280 as shown in Figs. 1 and 2. In case of fire, this fuse quickly burns off so that the weighted end 222 drops down and releases the detent 248 whereupon the weight 224 closes the valve 230.

We claim:

Apparatus for supplying liquid fuel to the heating plants comprising a burner, a pipe system connecting said burner with the source of supply, a receptacle included in said pipe system, two hand operated valves which cause the liquid fuel to pass into said receptacle in drops, and an automatically controlled valve which causes the liquid fuel to pass into said receptacle in variable quantity according to the amount of heat delivered by said burner.

In testimony whereof we hereunto affix our signatures.

JOHN E. ERICKSON.
WALTER F. ERICKSON.